US011362767B2

(12) United States Patent
Göktepe et al.

(10) Patent No.: US 11,362,767 B2
(45) Date of Patent: Jun. 14, 2022

(54) RECEIVER, TRANSMITTER, SYSTEM AND METHOD IMPLEMENTING A RETRANSMISSION PROCESS RESPONSIVE TO AN INDICATION THAT ENCODED DATA ON ALLOCATED RESOURCES IS NOT DECODABLE

(71) Applicant: Fraunhofer-Gesellschaft zur Förderung der angewandten Forschung e.V., Munich (DE)

(72) Inventors: Baris Göktepe, Berlin (DE); Thomas Fehrenbach, Berlin (DE); Cornelius Hellge, Berlin (DE); Thomas Schierl, Berlin (DE); Robin Thomas, Berlin (DE); Thomas Wirth, Kleinmachnow (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 48 days.

(21) Appl. No.: 16/707,538

(22) Filed: Dec. 9, 2019

(65) Prior Publication Data
US 2020/0162202 A1 May 21, 2020

Related U.S. Application Data (63) Continuation of application No. PCT/EP2018/066634, filed on Jun. 21, 2018.

(30) Foreign Application Priority Data

Jun. 23, 2017 (EP) .................................... 17177610

(51) Int. Cl.
*H04L 1/18* (2006.01)
*H04L 1/16* (2006.01)
(Continued)

(52) U.S. Cl.
CPC .......... *H04L 1/1812* (2013.01); *H04L 1/1671* (2013.01); *H04L 1/1822* (2013.01);
(Continued)

(58) Field of Classification Search
CPC ... H04L 1/1812; H04L 1/1671; H04L 1/1822; H04L 1/1858; H04L 1/1896;
(Continued)

(56) References Cited

U.S. PATENT DOCUMENTS

| 9,148,258 B2 | 9/2015 | Anders et al. |
| 2014/0044028 A1 | 2/2014 | Namir et al. |

(Continued)

FOREIGN PATENT DOCUMENTS

| CN | 104104482 A | 10/2014 |
| CN | 105763305 A | 7/2016 |

(Continued)

OTHER PUBLICATIONS

Ahmadreza Amirzadeh et al., "Physical Layer Secrecy for Wireless Communication Systems using Adaptive HARQ with Error Contamination", IEEE, Jun. 14, 2017.
(Continued)

*Primary Examiner* — Peter P Chau
(74) *Attorney, Agent, or Firm* — Novick, Kim & Lee, PLLC; Jae Youn Kim; Jihun Kim (57) ABSTRACT

A receiver includes an antenna, a transceiver coupled to the antenna, a decoder and a processor. The transceiver receives from a transmitter of a wireless communication network a data block. The data block includes encoded data transmitted on a plurality of resources allocated to the receiver. The decoder decodes the encoded data and determines for the allocated resources whether decoding of the encoded data was successful or failed. The processor evaluates whether one or more of the resources for which the decoding failed
(Continued)

are included in a report, the report indicating for one or more of the allocated resources that encoded data transmitted on the one or more allocated resources is not decodable or is likely to be not decodable, and causes the transceiver to send a retransmission request to the transmitter responsive to the evaluation.

33 Claims, 4 Drawing Sheets

(51) Int. Cl.
  *H04L 5/00* (2006.01)
  *H04W 72/08* (2009.01)
(52) U.S. Cl.
  CPC .......... *H04L 1/1858* (2013.01); *H04L 1/1896* (2013.01); *H04L 5/0055* (2013.01); *H04W 72/082* (2013.01)
(58) Field of Classification Search
  CPC ... H04L 5/0055; H04L 1/1607; H04L 1/0026; H04W 72/082
  See application file for complete search history.

(56) References Cited

U.S. PATENT DOCUMENTS

| | | | | |
|---|---|---|---|---|
| 2014/0112180 | A1* | 4/2014 | Axmon | H04W 24/08 |
| | | | | 370/252 |
| 2015/0139141 | A1 | 5/2015 | Seo et al. | |
| 2018/0270022 | A1* | 9/2018 | Sun | H04L 1/0061 |
| 2018/0270023 | A1* | 9/2018 | Jiang | H04L 1/0073 |
| 2018/0270705 | A1* | 9/2018 | Sun | H04L 1/1657 |
| 2018/0287745 | A1* | 10/2018 | Sun | H03M 13/1111 |
| 2018/0287746 | A1* | 10/2018 | Bergstrom | H04L 1/1854 |
| 2019/0268107 | A1* | 8/2019 | Yasukawa | H04L 1/1861 |
| 2019/0273574 | A1 | 9/2019 | Thomas et al. | |

FOREIGN PATENT DOCUMENTS

| | | |
|---|---|---|
| WO | 2009120460 A2 | 10/2009 |
| WO | 2016/149214 A1 | 9/2016 |
| WO | 2018/095796 A1 | 5/2018 |
| WO | 2018/206398 A1 | 11/2018 |

OTHER PUBLICATIONS

Livjot Sarangal, "Office Action for IN Application No. 201937052046", dated Mar. 24, 2021, Intellectual Property India, India.
Hyerin Kim, "Office Action for KR Application No. 10-2020-7001776", dated Mar. 24, 2021, KIPO, Republic of Korea.
Convida Wireless, "Discussion on eMBB and URLLC Mixing", vol. RAN WG1, No. Spokane, USA; Jan. 16, 2017-Jan. 20, 2017, Jan. 16, 2017 (Jan. 16, 2017), 3GPP Draft; R1-1701139_Discussion_on_EMBB_URLLC_Mixing, 3rd Generation Partnership Project (3GPP), Mobile Competence Centre ; 650, Route Des Lucioles ; F-06921 Sophia-Antipolis Cedex ; France, Retrieved from the Internet: URL:http://www.3gpp.org/ftp/Meetings_3GPP_SYNC/RAN1/Docs/, XP051208653.
Sequans Communications, "On dynamic resource sharing between URLLG and eMBB in DL", vol. RAN WG1, No. Spokane, USA; Jan. 16, 2017-Jan. 20, 2017, Jan. 16, 2017 (Jan. 16, 2017), 3GPP Draft; R1-1700642—On Dynamic DL Resource Sharing Between URLLC and EMBB, 3rd Generation Partnership Project (3GPP), Mobile Competence Centre ; 650, Route Des Lucioles ; F-06921 Sophia-Antipolis, Retrieved from the Internet: URL:http://www.3gpp.org/ftp/Meetings_3GPP_SYNC/RAN1/Docs/, XP051208653.
Samsung, "Indication of Pre-empted Resources Prior to HARQ-ACK Feedback", 3GPP Draft; R1-1711457, 3rd Generation Partnership Project (3GPP), Mobile Competence Centre; 650, Route des Lucioles; F-06921 Sophia-Antipolis Cedex; France, vol. RAN WG1, No. Qingdao, China; Jun. 27, 2017-Jun. 30, 2017, Jun. 17, 2017 (Jun. 17, 2017), XP051305591.
Panasonic, "PDCCH for DL URLLC resource puncturing indication", 3GPP Draft; R1-1708118, 3rd Generation Partnership Project (3GPP), Mobile Competence Centre; 650, Route des Lucioles; F-06921 Sophia-Antipolis Cedex; France, vol. RAN WG1, No. Hangzhou; May 15, 2017-May 19, 2017, May 14, 2017 (May 14, 2017), XP051273314.
Sony, "Further considerations on using pre-emption indicator for DL URLLC/eMBB multiplexing", 3GPP Draft R1-1708251—REL-15 NR—Further considerations on using pre-emption indicator V07, 3rd Generation Partnership Project (3GPP), Mobile Competence Centre; 650, Route des Lucioles; F-06921 Sophia, vol. RAN WG1, No. Hangzhou; May 15, 2017-May 19, 2017, May 14, 2017 (May 14, 2017), XP051273444.
Yuhuan Xu, "Extened European Search Report for EP Application No. 21203205.6", dated Feb. 3, 2022, EPO, Germany.
C. Assimakopoulos, "Performance evaluation of a recursive LA/IR protocol for MC-CDMA power line communications", IEEE 7th International Symposium on Spread Spectrum Techniques and Applications, Sept. 2-5, 2002.
Xin Wang, "Office Action for CN Application No. 201880048571.9", dated Dec. 22, 2021, CNIPA, China.
Sequan Communication, "On dynamic resource sharing between URLLC and eMBB in DL", 3GPP TSG RAN WG1 #AH, 3GPP, R1-1700642, Jan. 16-20, 2017, Spokane, US.
Convida Wireless, "Discussion on eMBB and URLLC Mixing", 3GPP TSG RAN WG1 #AH, 3GPP, R1-1701139, Jan. 16-20, 2017, Spokane, US.
Hye Rin Kim, "Office Action for KR Application No. 10-2021-7042185", dated Apr. 11, 2022, KIPO, Republic of Korea.

* cited by examiner

Fig. 1

PRIOR ART

RECEIVER, TRANSMITTER, SYSTEM AND METHOD IMPLEMENTING A RETRANSMISSION PROCESS RESPONSIVE TO AN INDICATION THAT ENCODED DATA ON ALLOCATED RESOURCES IS NOT DECODABLE

CROSS-REFERENCE TO RELATED APPLICATIONS

This application is a continuation of copending International Application No. PCT/EP2018/066634, filed Jun. 21, 2018, which is incorporated herein by reference in its entirety, and additionally claims priority from European Application No. 17177610.7, filed Jun. 23, 20917, which is also incorporated herein by reference in its entirety.

BACKGROUND OF THE INVENTION

The present invention concerns the field of wireless or wired communication networks or systems, more specifically, communication networks or services provided by communication networks which, following a transmission of data, may request a retransmission of data or a transmission of redundancy associated with the data. Embodiments of the present invention concern a retransmission process responsive to an indication that encoded data on allocated resources is not decodable or is likely to be not decodable at a receiver.

Figure 1:
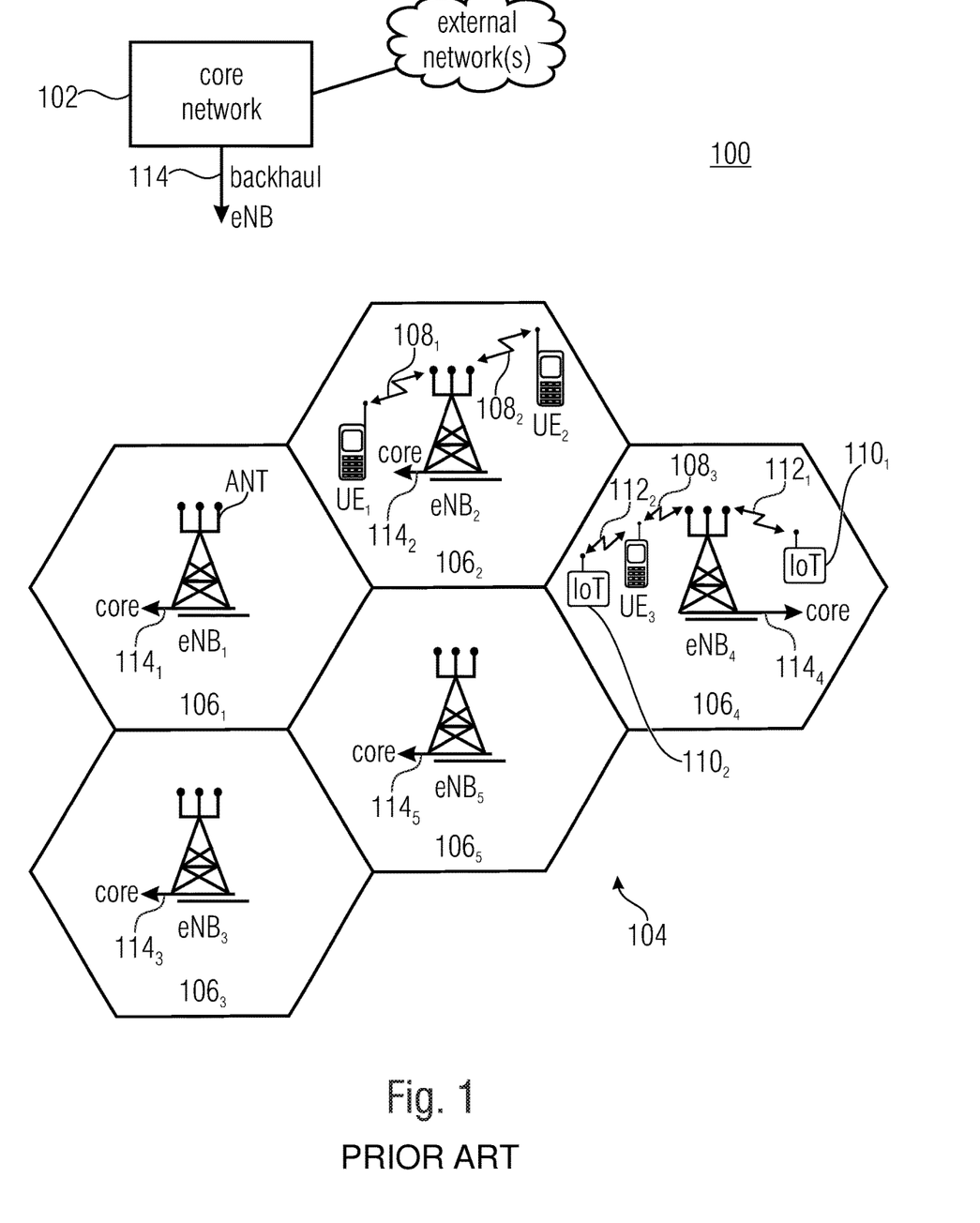
FIG. 1 shows a schematic representation of an example of a wireless communication system.

FIG. 1 is a schematic representation of an example of a wireless network 100 including a core network 102 and a radio access network 104. The radio access network 104 may include a plurality of base stations $eNB_1$ to $eNB_5$, each serving a specific area surrounding the base station schematically represented by respective cells $106_1$ to $106_5$. The base stations are provided to serve users within a cell. A user may be a stationary device or a mobile device. Further, the wireless communication system may be accessed by IoT devices which connect to a base station or to a user. The mobile devices or the IoT devices may include physical devices, ground based vehicles, such as robots or cars, aerial vehicles, such as manned or unmanned aerial vehicles (UAVs), the latter also referred to as drones, buildings and other items having embedded therein electronics, software, sensors, actuators, or the like as well as network connectivity that enable these devices to collect and exchange data across an existing network infrastructure. FIG. 1 shows an exemplary view of only five cells, however, the wireless communication system may include more such cells. FIG. 1 shows two users UE1 and UE2, also referred to as user equipment (UE), that are in cell $106_2$ and that are served by base station $eNB_2$. Another user $UE_3$ is shown in cell $106_4$ which is served by base station $eNB_4$. The arrows $108_1$, $108_2$ and $108_3$ schematically represent uplink/downlink connections for transmitting data from a user $UE_1$, $UE_2$ and $UE_3$ to the base stations $eNB_2$, $eNB_4$ or for transmitting data from the base stations $eNB_2$, $eNB_4$ to the users $UE_1$, $UE_2$, $UE_3$. Further, FIG. 1 shows two IoT devices $110_1$ and $110_2$ in cell $106_4$, which may be stationary or mobile devices. The IoT device $110_1$ accesses the wireless communication system via the base station $eNB_4$ to receive and transmit data as schematically represented by arrow $112_1$. The IoT device $110_2$ accesses the wireless communication system via the user $UE_3$ as is schematically represented by arrow $112_2$. The respective base station $eNB_1$ to $eNB_5$ are connected to the core network 102 via respective backhaul links $114_1$ to $114_5$, which are schematically represented in FIG. 1 by the arrows pointing to the "core". The core network 102 may be connected to one or more external networks.

For data transmission a physical resource grid may be used. The physical resource grid may comprise a set of resource elements to which various physical channels and physical signals are mapped. For example, the physical channels may include the physical downlink and uplink shared channels (PDSCH, PUSCH) carrying user specific data, also referred to as downlink and uplink payload data, the physical broadcast channel (PBCH) carrying for example a master information block (MIB) and a system information block (SIB), the physical downlink and uplink control channels (PDCCH, PUCCH) carrying for example the downlink control information (DCI), etc. For the uplink, the physical channels may further include the physical random access channel (PRACH or RACH) used by UEs for accessing the network once a UE synchronized and obtained the MIB and SIB. The physical signals may comprise reference signals (RS), synchronization signals and the like. The resource grid may comprise a frame having a certain duration, like 10 milliseconds, in the time domain and having a given bandwidth in the frequency domain. The frame may have a certain number of subframes of a predefined length, e.g., 2 subframes with a length of 1 millisecond. Each subframe may include two slots of 6 or 7 OFDM symbols depending on the cyclic prefix (CP) length.

The wireless communication system may be any single-tone or multicarrier system based on frequency-division multiplexing, like the orthogonal frequency-division multiplexing (OFDM) system, the orthogonal frequency-division multiple access (OFDMA) system, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used. The wireless communication system may operate, e.g., in accordance with the LTE-Advanced pro standard or the 5G or NR (New Radio) standard.

Data may also be communicated over channels of a wired communication network or a combination of wired and wireless networks, for example, a local area network (LAN), a G.hn network operating over different types of wires like telephone wires, coaxial cables and/or power lines, or a wide area network (WAN) such as the internet.

In the above referenced networks data, while being transmitted over the channel, may be overlaid with noise or subjected to other disturbances, like interferences, so that the data may not be processed correctly or may not be processed at all at the receiver. For example, when the data to be transmitted is encoded using a predefined code, the encoded data is generated at the transmitter and forwarded to the receiver over the channel. During the transmission, the encoded data may be disturbed to such an extent that decoding of the encoded data is not possible, e.g., because of noisy channel situations. To address such a situation, wired and/or wireless communication networks may employ a retransmission mechanism. For example, when the receiver detects that the encoded data cannot be decoded, a retransmission from the transmitter or sender is requested. For example, an HARQ (hybrid automatic repeat request) may be used to request a retransmission from the transmitter to correct decoding failures. For example, additional redundancy may be requested. At the transmitter, encoding the data includes generating redundancy that may include redundant bits that are added to the data to be transmitted. During a first transmission only a part of the redundancy may be transmitted. When a retransmission is requested, further parts of the redundancy may be send to the receiver. For example, HARQ may employ chase combining (every re-transmission contains the same information—data and parity bits), or incremental redundancy (every re-transmission contains different parity bits than the previous ones).

For example, in communication networks implemented in accordance with the LTE standard or implemented in accordance with the NR standard, a transport block (TB) may include one or more code blocks (CBs). In communication networks implemented in accordance with the LTE standard, the retransmission request may be a HARQ request, however, the HARQ feedback will provide feedback only for the entire TB such that even the failure of only a single CB will initiate the retransmission or the provision of additional redundancy for the entire TB. In wireless communication systems implemented in accordance with the NR standard, this drawback has been addressed by introducing code block groups (CBGs). For each CGB a HARQ feedback, e.g., a one bit HARQ feedback, may be provided so that only for CBGs of the TB for which decoding failed, a re-transmission or a transmission of additional redundancy is needed. Although the CBG-based HARQ feedback avoids the need for retransmissions/additional redundancy for the entire TB, still a multi-bit HARQ feedback is needed for each TB. This results in signaling overhead in the uplink communication and to resource allocation problems in the physical uplink control channel (PUCCH), which may arise due to the necessity to allocate additional resources for signaling to the transmitter details about the actual CBGs for which the decoding failed.

SUMMARY

According to an embodiment, a receiver may have: an antenna; a transceiver coupled to the antenna, the transceiver configured to receive from a transmitter of a wireless communication network a data block, the data block including encoded data transmitted on a plurality of resources allocated to the receiver; a decoder configured to decode the encoded data and to determine for the allocated resources whether decoding of the encoded data was successful or failed; and a processor configured to evaluate whether one or more of the resources for which the decoding failed are included in a report, the report indicating for one or more of the allocated resources that encoded data transmitted on the one or more allocated resources is not decodable or is likely to be not decodable, and to cause the transceiver to send a retransmission request to the transmitter responsive to the evaluation.

According to another embodiment, a transmitter may have: an antenna; a transceiver coupled to the antenna, the transceiver configured to communicate with one or more receivers of a wireless communication network, the one or more receivers served by the transmitter; wherein the transceiver is configured to transmit to the one or more receivers a report, the report indicating for one or more resources, which are allocated to the one or more receivers, that encoded data transmitted on the one or more allocated resources is not decodable or is likely to be not decodable.

According to still another embodiment, a communication network may have: one or more inventive receivers as mentioned above, and one or more transmitters, having an antenna; a transceiver coupled to the antenna, the transceiver configured to communicate with one or more receivers of a wireless communication network, the one or more receivers served by the transmitter; wherein the transceiver is configured to transmit to the one or more receivers a report, the report indicating for one or more resources, which are allocated to the one or more receivers, that encoded data transmitted on the one or more allocated resources is not decodable or is likely to be not decodable.

According to another embodiment, a method may have the steps of: receiving from a transmitter of a wireless communication network a data block, the data block including encoded data transmitted on a plurality of resources allocated to the receiver; decoding the encoded data; determining for the allocated resource whether decoding of the encoded data was successful of failed; evaluating whether one or more of the resources for which the decoding failed are included in a report, the report indicating for the one or more allocated resources that encoded data transmitted on the one or more allocated resources is not decodable or is likely to be not decodable, and sending a retransmission request to the transmitter responsive to the evaluation.

According to another embodiment, a method may have the step of: communicating with one or more receivers of a wireless communication network, the one or more receivers served by a transmitter; wherein communicating with one or more receivers has transmitting to the one or more receivers a report, the report indicating for one or more resources allocated to the one or more receivers that encoded data transmitted on the one or more allocated resources is not decodable or is likely to be not decodable.

Another embodiment may have a non-transitory digital storage medium having stored thereon a computer program for performing a method having the steps of: receiving from a transmitter of a wireless communication network a data block, the data block including encoded data transmitted on a plurality of resources allocated to the receiver; decoding the encoded data; determining for the allocated resource whether decoding of the encoded data was successful of failed; evaluating whether one or more of the resources for which the decoding failed are included in a report, the report indicating for the one or more allocated resources that encoded data transmitted on the one or more allocated resources is not decodable or is likely to be not decodable, and sending a retransmission request to the transmitter responsive to the evaluation, when said computer program is run by a computer.

Still another embodiment may have a non-transitory digital storage medium having stored thereon a computer program for performing a method having the step of: communicating with one or more receivers of a wireless communication network, the one or more receivers served by a transmitter; wherein communicating with one or more receivers has transmitting to the one or more receivers a report, the report indicating for one or more resources allocated to the one or more receivers that encoded data transmitted on the one or more allocated resources is not decodable or is likely to be not decodable, when said computer program is run by a computer.

BRIEF DESCRIPTION OF THE DRAWINGS

Embodiments of the present invention are now described in further detail with reference to the accompanying drawings, in which.

DETAILED DESCRIPTION OF THE INVENTION

In the following, embodiments of the present invention are described in further detail with reference to the enclosed drawings in which elements having the same or similar function are referenced by the same reference signs.

In accordance with embodiments the present invention provides a receiver, like a UE, comprising an antenna, a transceiver, a decoder and a processor. The transceiver is coupled to the antenna and receives from a transmitter, like a base station, of a wireless communication network a data block. The data block includes encoded data transmitted using a plurality of resources allocated to the receiver. The decoder decodes the encoded data and determines for the allocated resources whether decoding of the encoded data was successful or failed. The processor evaluates whether one or more of the resources for which decoding failed are included in a report. The report indicates for one or more of the allocated resources that encoded data transmitted on the one or more allocated resources is not decodable. The processor causes the transceiver to send a retransmission request to the transmitter responsive to the evaluation.

In accordance with embodiments, the present invention provides a transmitter, like a base station, having an antenna and a transceiver. The transceiver is coupled to the antenna and communicates with one or more receivers, like UEs, of the wireless communication network. The one or more receivers are served by the transmitter. The transmitter transmits to the one or more receivers the above mentioned report or pollution report which indicates for one or more resources, which are allocated to the receivers, that encoded data transmitted on the one or more allocated resources is not decodable.

Embodiments of the inventive approach provide a communication network including one or more of the receivers, like UEs, implemented in accordance with the inventive approach, as well as one or more transmitters, like base stations, implemented in accordance with the inventive approach.

In accordance with embodiments, an allocated resource may comprise one or more resource elements of a physical resource grid as described above. The data to be transmitted is encoded and provided as one or more code blocks (CBs). An allocated resource may be used for transmitting one or more CBs, in the latter case, a group of CBs may be defined, also referred to as code block group (CBG) so that a plurality of resources allocated to the receiver may be used for transmitting a plurality of CBGs.

The report may indicate that encoded data that is transmitted on one or more of the allocated resources is not decodable. Data transmitted may not be decodable in case the one or more resources experience an impairment or disturbance originating from the base station and/or from one or more further base stations and/or other entities, like other UEs, of the wireless communication network. The one or more further base stations may be base stations adjacent or being in neighborhood to the base station serving the UE. The impairments or detrimental effects on the allocated resources, which are caused by the one or more base stations, may comprise puncturing, interference or reduction of a signal strength. When deciding about the transmission of a data block from a base station to a UE, e.g., for a specific transmission period, like one or more slots, subframes or frames of the physical resource grid, resources considered reliable for the transmission of the encoded data are allocated. However, the reliability of the resources used for the transmission of the encoded data to the UE may vary over time. For example, specific events may cause an impairment of the resource, for example due to puncturing, interference or reduction of signal strength of the signal transmitted using the resource in question. In case such a situation occurs, the encoded data on the resource is likely to be not decodable at the UE.

A resource allocated for transmission of data to the UE may experience an impairment from the base station, it is served by or from surrounding base stations in response to unexpected traffic. Such unexpected traffic may be caused by services using an ultra-reliable low latency (URLLC) transmission, or, more general, by any other kind of spontaneous transmission for services using a high priority transmission of data. When a URLLC service connects to the network via the base station serving the UE, one of the resources originally allocated to the UE may be allocated to the URLLC service or traffic so that this resource is no longer available for a transmission of data to the UE, which is also referred to as puncturing. Even in case the base station serving the UE does not use one of the resources allocated to the UE for the URLLC transmission, the signal requirements of the URLLC transmission may entail a certain signal strength so that the URLLC data transmission is in accordance with the URLLC requirements. This may entail an increase in the signal strength, however, a base station operates, generally, on the basis of a preset power budget for a communication with all active users served by the base station. Due to the limits of the available power the signal strengths on one or more of the resources allocated to the UE for the transmission of data from the base station to the UE may be reduced as more power is needed for the higher signal strength for the URLLC transmission. This reduced signal strength may also be a cause for data on one or more of the resources allocated to the UE to become not decodable at the UE, for example, because due to the reduced signal strengths on one or more of the resources the signals on the respective resources may be more susceptible to interferences, noise and other disturbances on the channel between the base station and the UE.

In case the URLLC traffic is not in the cell in which the UE is located but in a neighboring cell, the high signal strength URLLC transmission in the neighboring cell using specific resources may cause interference on the corresponding resources in the cell in which in the UE is located.

It has been found that decoding failures of code blocks or code block groups is mainly due to the above described impairments or effects like puncturing, interference and low signal strength in the cell in which the UE is located and/or in neighboring cells due to unexpected traffic, for example URLLC traffic. The URLLC traffic may occur at any time and unexpectedly so that resources which have been allocated to the UE and which have been considered reliable at the time of allocation may, at a later time, no longer provide for a reliable communication path in that the encoded data transmitted using these resources may not be decodable at the UE.

The inventive approach uses the knowledge about resources allocated to a UE that experience impairments, like puncturing, interference or reduced signal strengths, so that it is likely or probable that encoded data transmitted over these resources cannot be successfully decoded at the UE. The knowledge is provided in the report accessible by the UE, also referred to as a pollution report. The report indicates the resources allocated to the UE which are affected by the impairments and, therefore, are likely to include encoded data that cannot be successfully decoded. The inventive approach assumes that, in general, decoding failures at the UE are most likely to occur for data transmitted on resources which experience impairments, while other allocated resources which do not experience the impairments are considered to be decodable. The inventive approach uses this property or knowledge for reducing the amount of information that is needed for requesting a retransmission or additional redundancy in case of decoding failures at the UE.

While the above described known approaches send at least one bit for each CBG of the TB, in accordance to the present invention the knowledge about resources experiencing impairments is exploited, more specifically, on the basis of the pollution report it is determined whether a decoding failure was on a resource indicated in the pollution report. A single message may be returned to the base station, in case of a failure on a resource indicated in the pollution report, and the base station may provide for a retransmission or for additional redundancy for all of the resources indicated in the pollution report, i.e., a retransmission or additional redundancy is sent for all of the encoded data that is transmitted over resources indicated in the pollution report. Thus, the amount of information needed for a retransmission request is substantially reduced, as is the signaling overhead and any problem regarding resource scheduling in the PUCCH.

There may also be situations in which it is determined that the decoding failed on a resource which is not included in the pollution report. In such a case the invention may use a conventional HARQ process for requesting from the base station a retransmission of or additional redundancy for the TB or one or more of the CBGs in the TB.

In accordance with embodiments, the retransmission process may be a HARQ process, a predictive HARQ process or an early HARQ process.

An example for the predictive HARQ process is described, e.g., in European Patent Application 16200361.0, "RECEIVER, TRANSMITTER, COMMUNICATION NETWORK, DATA SIGNAL AND METHOD IMPROVING A RETRANSMISSION PROCESS IN A COMMUNICATION NETWORK", filed on Nov. 23, 2016, which is incorporated herewith by reference. For implementing the predictive HARQ process a base station may include a LDPC (low-density parity-check) encoder that receives data to be transmitted to a UE. The LDPC encoder encodes the data using a LDPC code to obtain a codeword. The codeword is defined by a plurality of variable nodes associated with a plurality of the check nodes of a bipartite graph representing the LDPC code. The codeword is transmitted to the UE such that selected variable nodes associated with a subset of the check nodes of the bipartite graph are transmitted prior to the remaining variable nodes. The selected variable nodes define a subcodeword known at the UE. The subcodeword is used by the UE to estimate a decodability of the transmitted codeword prior to receiving all variable nodes of the codeword. The UE includes a LDPC decoder that estimates the decodability of the transmitted codeword using the subcodeword prior to receiving all variable nodes of the codeword.

An example for the early HARQ process is described, e.g., in European Patent Application 17170871.2, "RECEIVER, TRANSMITTER, COMMUNICATION NETWORK, DATA SIGNAL AND METHOD IMPROVING A RETRANSMISSION PROCESS IN A COMMUNICATION NETWORK", filed on May 12, 2017, which is incorporated herewith by reference. The early HARQ process allows for an early retransmission request to be sent, also referred to an early HARQ feedback. The early HARQ feedback allows reducing the retransmission delay or HARQ delay experienced when implementing conventional HARQ procedures. The feedback timing is reduced to a minimum time, and allows providing redundancy, such as further redundancy versions (RVs) of the data, at an earlier stage. In accordance with the early HARQ process one or multiple code blocks (CBs) may be provided in the data block or TB. In case the TB includes a plurality of CBs, respective ones of the CBs may be grouped to form a plurality of code block groups (CBGs). In other words, each CBG may include at least one CB or at maximum all CBs provided in the TB. Other than the TB, each CBG may be processed independently at the UE with a separate feedback for each CBG. To allow for the early feedback the code block in the data block has a plurality of parts, and a first part of the code block is used for estimating a decodability of the code block at the UE. The first part may be obtained by using an approach as described in the above mentioned European Patent Application EP 16200316.0. The first part may also be any other subset of the CB if a LLR (log-likelihood ratio) estimation is used. The first part of the code block is arranged in the data block ahead of the remaining one or more parts of the code block. By placing the first part of the code block ahead of the remaining parts, the first part is transmitted prior to the remaining parts of the CB, and an estimation of the decodability of the code block may already start at the UE while the data block is still received at the UE. Responsive to the estimation the HARQ feedback may be sent as early as possible, for example separately for each CB.

Figure 2:
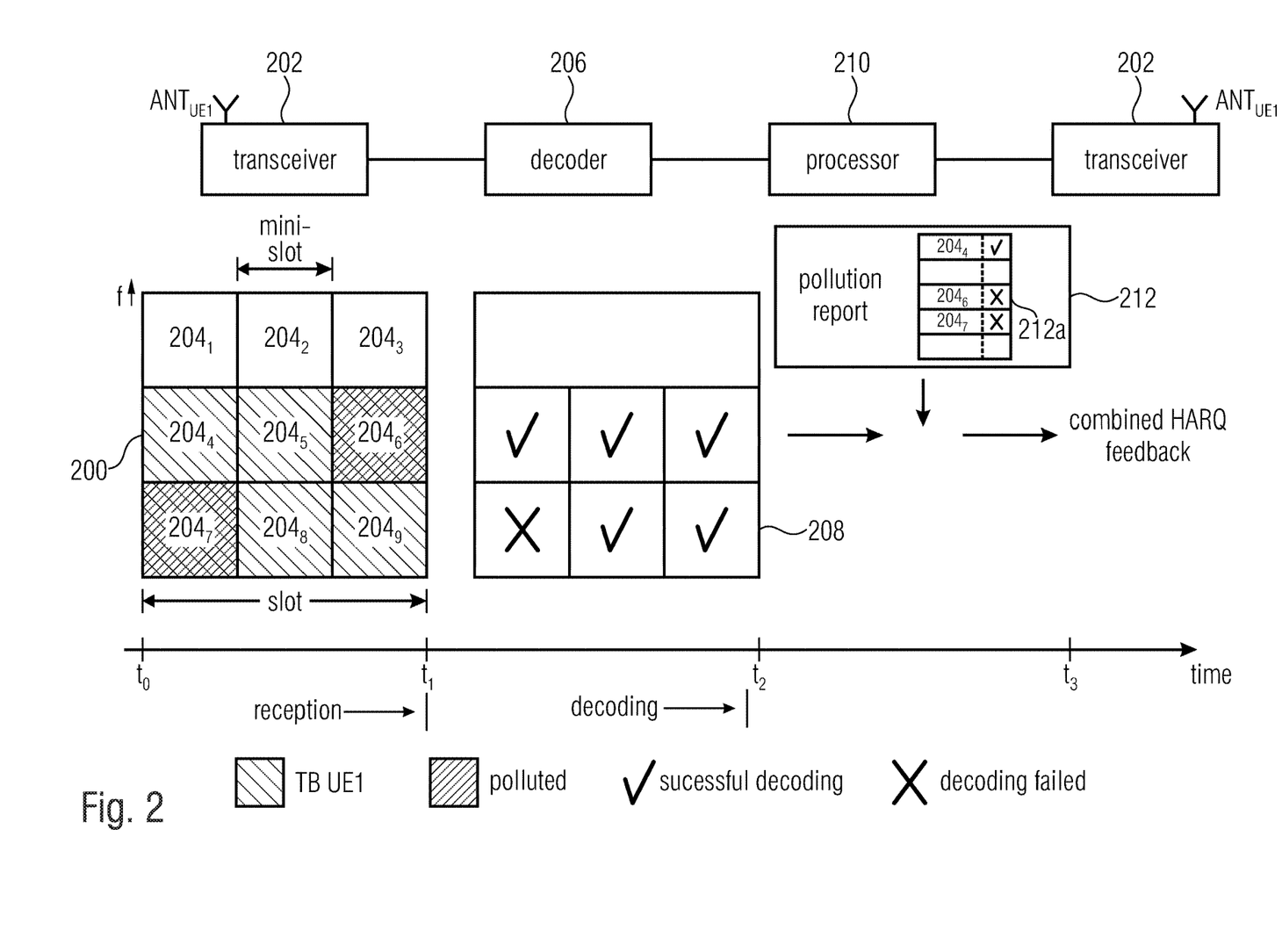
FIG. 2 shows a timeline of a CBG-based HARQ feedback reduction approach in accordance with an embodiment of the present invention.

FIG. 2 shows a timeline of a CBG-based HARQ feedback reduction approach in accordance with an embodiment of the present invention. The processing of the data and the generation of the HARQ feedback is explained together with a reference to the involved elements of the UE. At time to a data block 200 is received at a receiver 202 of the UE, which is coupled to one or more antennas $ANT_{UE}$ of the UE. The data block 200 may be a physical resource grid as explained above and may include a plurality of resources $204_1$ to $204_9$. The resources $204_1$ to $204_9$ may include one or more resource elements of the physical resource grid described above, and the data to be transmitted is encoded and provided as one or more code block groups (CBGs). In the example of FIG. 2, one or more allocated resource are used for transmitting a code block group (CBG). Each resource may be associated with one CBG, however, in other embodiments a CBG may use more than one resource. The data block 200 includes resources allocated to a plurality of UEs served by the base station of the wireless communication network. The resources $204_1$ to $204_3$ are allocated to other UEs and only resource $204_4$ to $204_9$ are allocated the current UE. The resource $204_4$ to $204_9$ allocated the current UE may define a TB. It is noted that the invention is not limited to the size of the data block 200 shown in FIG. 2, rather, in accordance with other embodiments the data block may include more or less resources.

Reception of the data block 200 is completed at time $t_1$. Following the reception, at time $t_2$, decoding of the encoded data, which are transmitted on the respective resources $204_4$ to $204_9$ allocated to the UE, by a decoder 206 begins. As is schematically indicated at 208 the decoder 206 determines for each of the resources $204_4$ to $204_9$ allocated to the UE whether data carried by these resources can be successfully decoded or not. In the embodiment of FIG. 2 it is assumed that decoding was successful for all resources except for resource $204_7$ as indicated by the letter "x" at 208.

Following the decoding and the determination whether the decoding of data on specific resources was successful or failed, at time $t_3$, a processor 210 of the UE determines whether the resource $204_7$ for which the decoding of data failed, is within a pollution report 212 that is available at the UE. The pollution report indicates which of the resources $204_4$ to $204_9$ allocated to the UE may be polluted. In the embodiment of FIG. 2, the pollution report is assumed to indicate that resources $204_6$ and $204_7$ are polluted, i.e. the pollution report indicates that data transmitted on resources $204_6$ and $204_7$ cannot be decoded successfully by the decoder 206. As explained above, the resources $204_6$ and $204_7$ may be polluted, e.g., they may experience some disturbances or impairments due to unexpected traffic.

In accordance with embodiments, the pollution report may include a table in which the respective resources or groups of resources allocated to the UE are indicated, and for each of the resources or groups of resources it is indicated whether they are "polluted", e.g., that a decoding of data transmitted over the resource/resources is likely to fail due to some interference, puncturing or reduced signal strength experienced on the respective resources or groups of resources. This table is schematically represented in FIG. 2 at 212a. In accordance with other embodiments, the pollution report may be implemented in a different way.

Following the determination that decoding failed data on resource $204_7$, at time $t_4$, the processor 210 causes the transceiver 202 to transmit via the antenna $ANT_{UE}$ a HARQ feedback message requesting a retransmission or additional redundancy. The HARQ feedback message includes a single message, e.g., a single or two bit message, indicating that all of the encoded data was successfully decoded or that there was a decoding failure. The retransmission message does not include any indication about the actual resources or actual CBGs for which the decoding failed. This allows reducing or minimizing the size of the retransmission message and any signaling overhead. Also, it is not necessary to allocate any resources in the PUCCH for the uplink transmission of information identifying the CBGs for which the decoding failed. Responsive to the retransmission message indicating that there was a decoding failure, the base station, on the basis of the pollution report also available at the base station, initiates a retransmission or the transmission of additional redundancy for the data that has been transmitted on the resources indicated in the report as being polluted—in the example of FIG. 2 for resource $204_7$, for which the decoding actually failed, but also for the data that has been transmitted on resource $204_6$.

The inventive approach assumes that decoding errors are most likely to occur in polluted resources. Therefore, in accordance with embodiments, a simple HARQ feedback message, e.g., a single bit HARQ feedback message, is sufficient for requesting a retransmission of data or additional redundancy for the data as then, the base station on the basis of the pollution report determines what data needs to be retransmitted or for what data additional redundancy needs to be transmitted back to the UE.

In the less likely case that a decoding error occurs in one of the resources $204_4$, $204_5$, $204_8$, or $204_9$ which are assumed to be not polluted, i.e., which are assumed to not experience any impairments, e.g., due to unexpected traffic, a conventional HARQ retransmission request may be transmitted for the CBG in which the failure outside the resources indicated in the pollution report occurred.

In accordance with embodiments the UE may be a CBG-eMBB (enhanced mobile broadband) UE, and the base station may signal to the UE or to a group of UEs the critical resources which may be effected by puncturing, interference or low signal strength using the pollution report. The signaling of the critical resources via the pollution report allows the CBG-eMBB UE to reduce its feedback, for example, to one bit in accordance one embodiment or to two bits in accordance with another embodiment.

In the one bit embodiment, a NACK message (non-acknowledgment message) will automatically cause a retransmission of the CBGs or the transmission of additional redundancy for the CBGs which have been predicted to be polluted, for example by interference. In the unlikely case that a non-polluted resource was affected, this may be handled by a detailed CBG HARQ feedback in the next HARQ retransmission including a complimentary retransmission, a full retransmission or the transmission of redundancy of the data.

In accordance with the two bit embodiment, a two or multi bit message may be used for signaling the HARQ feedback. A first message may be an acknowledgment message ACK indicating that all data was successfully decoded. A first non-acknowledgment message NACK1 may be sent in case decoding failed only for one or more of the polluted resources, and a second non-acknowledgement message NACK2 may be sent in case decoding failed also on one or more of the non-polluted resources, i.e., on resources indicated in the pollution report and on resources not indicated in the pollution report. The second non-acknowledgment message NACK2 may include a request for further resource allocation to allow the UE to transmit a detailed CBG feedback or it may automatically cause a full retransmission or the transmission of redundancy for the entire TB or data block.

In accordance with further embodiments using the two or multi bit message, the pollution report may indicate for the one or more resources a probability that the encoded data is not decodable, and a plurality of pollution levels are provided with which the respective allocated resources are associated dependent on their probability that the encoded data is not decodable. The probability that a data is not decodable depends on the impairments to the respective resources. In accordance with embodiments, puncturing has a higher probability of causing a decoding failure than an interference from a neighboring cell, and an interference from the neighboring cell is considered to have a higher probability of causing a decoding failure than a reduced signal strength for transmitting the data. In case the pollution table includes pollution levels, the request transmission message may signal to the base station more than two non-acknowledgment messages, each associated with a specific pollution level to allow the base station to only cause the retransmission or the provision of additional redundancy for such data that has been transmitted on resources associated with the signaled pollution level. For example, when considering a situation in which the decoding of data failed only for resources which experience puncturing, a corresponding non-acknowledgment message NACK1 may be transmitted by the UE to the base station indicating, for example, a pollution level 2 which causes the base station to only cause the retransmission or the provision of additional redundancy for data transmitted over resources experiencing puncturing. In case it is determined that decoding failed for data transmitted on one or more allocated resources which experience interference, a second message NACK2 may be transmitted signaling to the base station a pollution level 1 which indicates that resources experience puncturing and interference are affected so that the retransmission or the provision of additional redundancy is provided only for data on resources experiencing puncturing and interference. In case a decoding failure occurred for a resource which is neither associated with puncturing nor with interference, for example a resource which operates at reduced signal strength, a third message NACK3 is transmitted to the base station which, responsive to this message signaling that a decoding failure due to a pollution level 3 has occurred, will cause a retransmission of all data or of redundancy for all data transmitted on the resources defined in the pollution report.

In the example described with reference to FIG. 2, after the complete data block or TB has been decoded it is determined whether the decoding was successful or failed. In accordance with other embodiments, a predictive HARQ process or an early HARQ may be implemented allowing to determine the decodability of the TB, CB or CBG prior to receiving the entire TB, CB or CBG. In other words, the non-decodability of the data on a specific resource may be determined using predictive HARQ or early HARQ, and the retransmission message may be generated using the decodability estimation and the pollution report.

FIG. 2 describes an embodiment in which the pollution report is already present at the UE, however, in accordance with other embodiments the pollution report may be provided to the UE either following the decoding of the data block and prior to determining the allocated resources for which decoding was successful or failed, or it may be requested and transmitted from a base station in case the decoding failed.

In accordance with embodiments of the present invention, the pollution report may be generated by the base station serving the UE and/or by the one or more adjacent base stations. The base stations may communicate with each other, for example, via a backhaul connection, like the X2 interface. The pollution report for one or more UEs may be generated at the serving base station, e.g., on the basis of a transmission pattern of the base station serving the UEs. Also transmission patterns of one or more adjacent base stations may be considered. In accordance with embodiments, the base stations of the wireless communication network may communicate among each other about the resources which are likely or probably affected by an impairment, e.g., interference or the like, via the X2 interface. A base station may tell a neighboring cell about unexpected transmissions, like URLLC transmissions, that are likely to disturb the UEs of other cells which are close to the base station.

In accordance with embodiments, a plurality of base stations in a wireless communication network may operate on the basis of an agreed transmission pattern established, e.g., on the basis of the inter cell interference coordination (ICIC) approach. In case such an agreed transmission pattern exists, after the transmission of one data block, the agreed transmission patterns may be evaluated to see whether any of the resources defined in the transmission pattern experience impairments due to the unexpected transmissions so that, based on such adaptions of the transmission patterns, the pollution report may be generated.

The pollution report is generated by the base station serving the UE, and is transmitted to the UE. In accordance with embodiments, the base station may broadcast a pollution report including all resources that are probably effected by an impairment, i.e., which are most likely to transmit data in a way that it cannot be decoded at the UE. When broadcasting the pollution report, it includes information for a plurality or all resources allocated by the base station. The UEs served by the base station listens to the broadcast and extracts from the report the information which is relevant for them, i.e. they extract from the received pollution report those resources allocated to them to perform the above described approach for determining whether a failed decoding occurred on a resource indicated in the pollution report.

In accordance with other embodiments, a dedicated signaling of the pollution report may be performed by the base station which tells one UE or a group of UEs which of their resources experience impairments.

In accordance with further embodiments, the UE may provide for a dynamic HARQ feedback in that the UE may report a failed decoding action at the UE either in accordance with the inventive approach or it may directly provide a detailed HARQ feedback which includes the decoder outcome of all CBGs related to the current TB.

Figure 3:
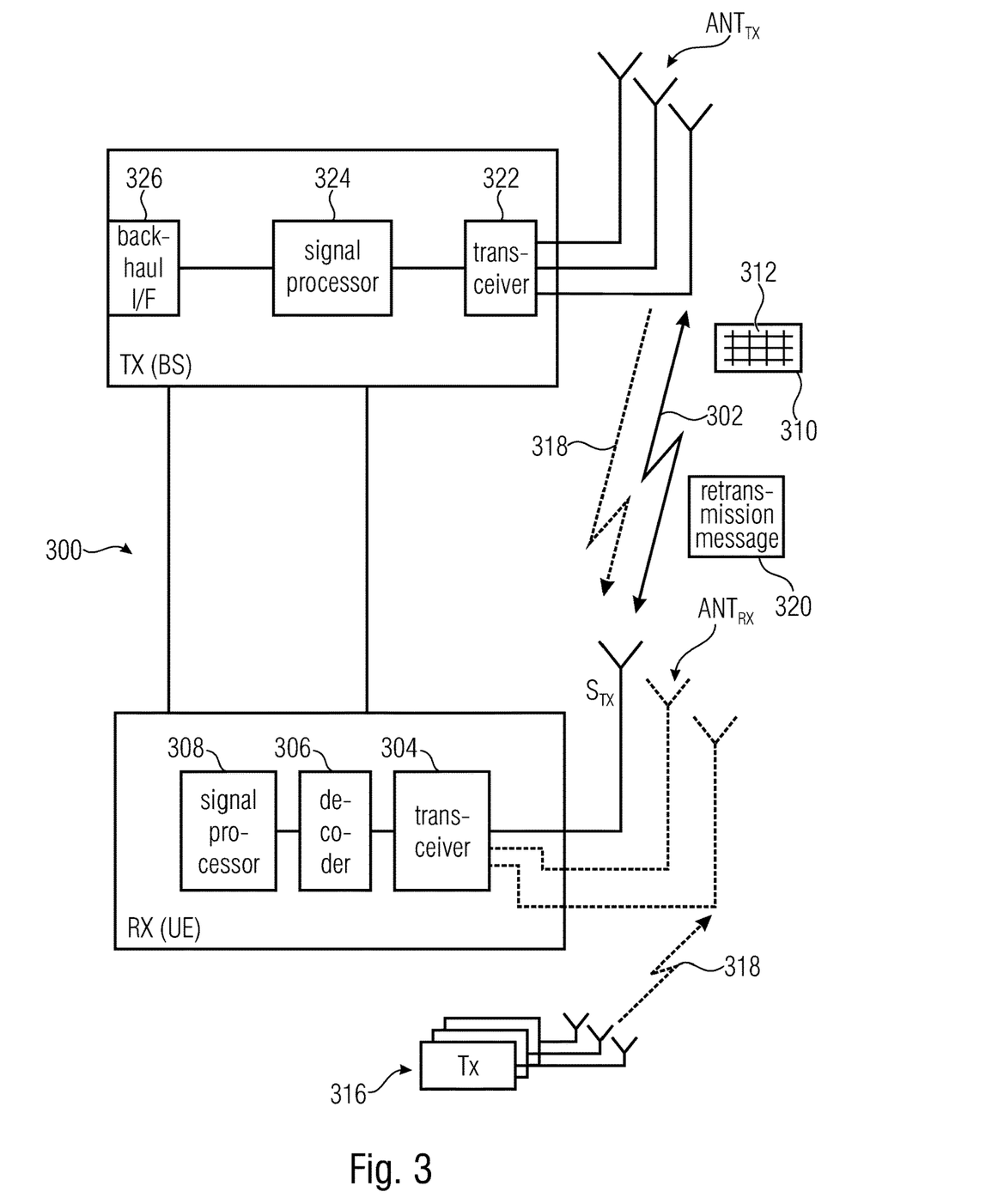
FIG. 3 is a schematic representation of a wireless communication system for transmitting information from a transmitter to a receiver.

Embodiments of the present invention may be implemented in a wireless communication system as depicted in FIG. 1 including base stations, users, like mobile terminals or IoT devices. FIG. 3 is a schematic representation of a wireless communication system 300 for communicating information between a transmitter TX and a receiver RX and operating in accordance with embodiments of the inventive approach described above. The transmitter TX, e.g., the bases station, includes one or more antennas $ANT_{TX}$ or an antenna array having a plurality of antenna elements. The receiver RX, e.g., the UE, includes at least one antenna $ANT_{RX}$. In other embodiments, the receiver RX may include more than one antenna. As is indicated by the arrow 302 signals are communicated between the transmitter TX and the receiver RX via a wireless communication link, like a radio link. The operation of the transmitter TX and the receiver RX and the signaling between the transmitter TX and the receiver RX is in accordance with the above described embodiments of the present invention.

For example, the receiver RX includes the one or more antennas $ANT_{RX}$, a transceiver 304 coupled to the antenna, a decoder 306 and a processor 308. The transceiver 304 receives from the transmitter TX of the wireless communication network 300 a data block 310. The data block 310 includes encoded data transmitted on a plurality of resources 312 allocated to the receiver RX. The decoder 310 decodes the encoded data and determines for the allocated resources 312 whether decoding of the encoded data was successful or failed. The processor 308 evaluates whether one or more of the resources 312 for which the decoding failed are included in a report 314. The report 314 indicates for the one or more allocated resources 312 that encoded data transmitted on the one or more of the allocated resources is not decodable, e.g., due to impairments, like puncturing, interference or a reduction of a signal strength, the resources may experiences from the transmitter TX and/or from one or more further transmitters 316 of the wireless communication network 300 as is schematically represented at 318. The processor 308 causes the transceiver 304 to send a retransmission request 320 to the transmitter TX responsive to the evaluation.

In accordance with embodiments, the transmitter TX includes the one or more antennas $ANT_{TX}$ and a transceiver 322 coupled to the antenna $ANT_{TX}$. The transceiver 322 communicates with one or more receivers RX of the wireless communication network 300. The one or more receivers RX are served by the transmitter TX. The transceiver 322 transmits to the one or more receivers RX the report 310. The report 310 indicates for one or more resources 312, which are allocated to the one or more receivers RX, that encoded data transmitted on the one or more of the allocated resources is not decodable. In accordance with embodiments, the transmitter TX may include a processor 324 which generates the report 310 based on information from the transmitter TX and/or from the one or more further transmitters 318. The information may indicate that data transmitted on certain resources is probably not decodable at the receiver. In embodiments in which also the information from the one or more further transmitters 318 is used for creating the report, the transmitter TX may include a backhaul interface 326 to the one or more further transmitters 318 of the wireless communication network 300.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 4:
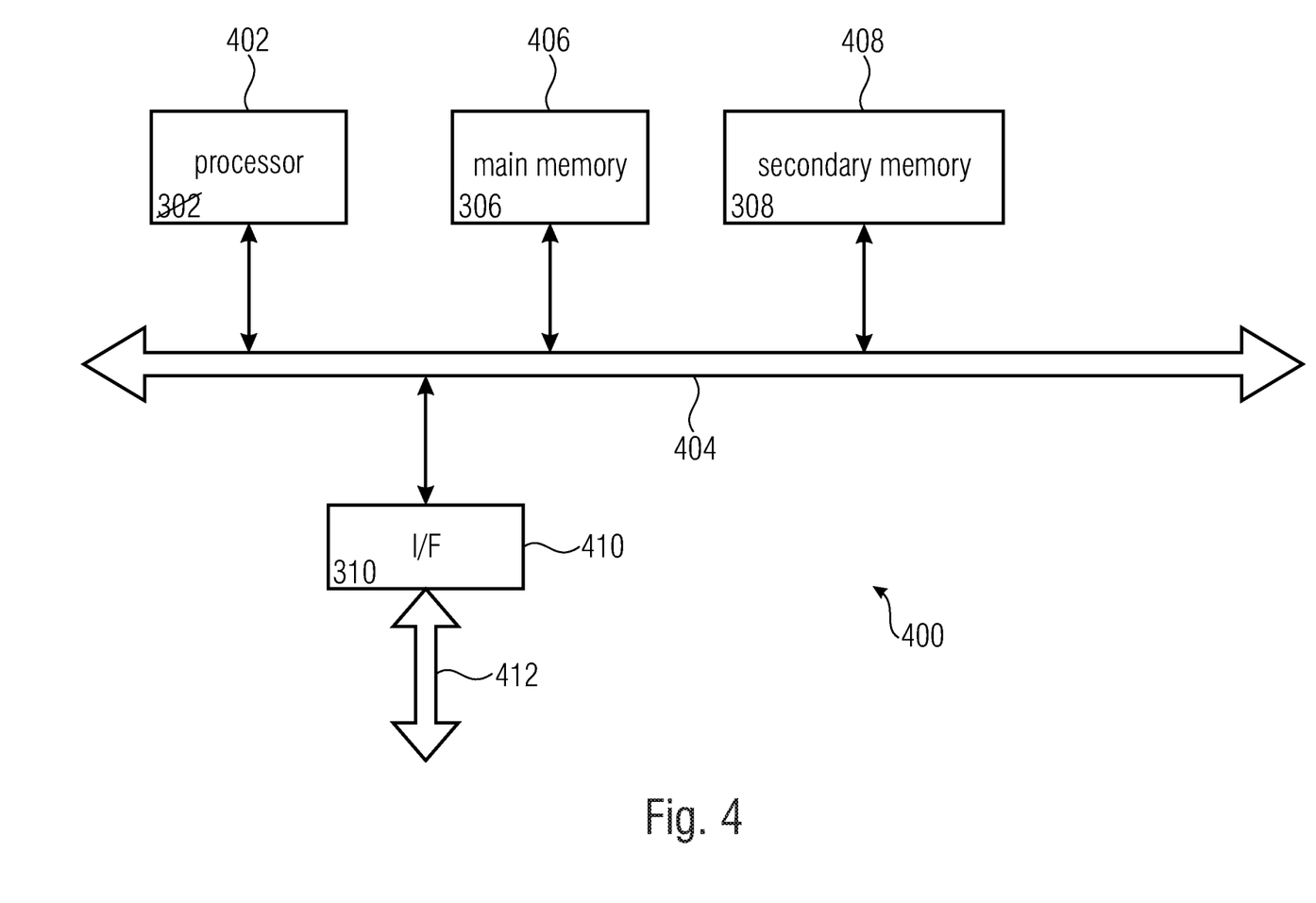
FIG. 4 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 4 illustrates an example of a computer system 400. The units or modules as well as the steps of the methods performed by these units may execute on one or more computer systems 400. The computer system 400 includes one or more processors 402, like a special purpose or a general purpose digital signal processor. The processor 402 is connected to a communication infrastructure 404, like a bus or a network. The computer system 400 includes a main memory 406, e.g., a random access memory (RAM), and a secondary memory 408, e.g., a hard disk drive and/or a removable storage drive. The secondary memory 408 may allow computer programs or other instructions to be loaded into the computer system 400. The computer system 400 may further include a communications interface 410 to allow software and data to be transferred between computer system 400 and external devices. The communication may be in the form electronic, electromagnetic, optical, or other signals capable of being handled by a communications interface. The communication may use a wire or a cable, fiber optics, a phone line, a cellular phone link, an RF link and other communications channels 412.

The terms "computer program medium" and "computer readable medium" are used to generally refer to tangible storage media such as removable storage units or a hard disk installed in a hard disk drive. These computer program products are means for providing software to the computer system 400. The computer programs, also referred to as computer control logic, are stored in main memory 406 and/or secondary memory 408. Computer programs may also be received via the communications interface 410. The computer program, when executed, enable the computer system 400 to implement the present invention. In particular, the computer program, when executed, enable processor 402 to implement the processes of the present invention, such as any of the methods described herein. Accordingly, such a computer program may represent a controller of the computer system 400. Where the disclosure is implemented using software, the software may be stored in a computer program product and loaded into computer system 400 using a removable storage drive, an interface, like communications interface 410.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

The above-described embodiments merely represent an illustration of the principles of the present invention. It is understood that other persons skilled in the art will appreciate modifications and variations of the arrangements and details described herein. This is why it is intended that the invention be limited only by the scope of the following claims rather than by the specific details that have been presented herein by means of the description and the discussion of the embodiments.

The invention claimed is:

1. A receiver, comprising:
an antenna;
a transceiver coupled to the antenna, the transceiver configured to receive from a transmitter of a wireless communication network a data block, the data block comprising encoded data transmitted on a plurality of resources allocated to the receiver;
a decoder configured to decode the encoded data and to determine for the allocated resources whether decoding of the encoded data was successful or failed; and
a processor configured
   to evaluate whether one or more of the allocated resources for which the decoding failed are comprised in a report, the report indicating for the one or more of the allocated resources that encoded data transmitted on the one or more allocated resources is not decodable or is likely to be not decodable, and
   to cause the transceiver to send a retransmission request to the transmitter responsive to the evaluation,
wherein the report indicates for the one or more allocated resources a probability that the encoded data transmitted on the one or more allocated resources is not decodable,
wherein the report associates the one or more allocated resources with a plurality of pollution levels dependent of the probability that the encoded data transmitted on the one or more allocated resources is not decodable, and
wherein the probability depends on impairments the one or more allocated resources experience by the transmitter and/or by one or more further transmitters of the wireless communication network.

2. The receiver of claim 1, wherein the encoded data transmitted on the one or more allocated resources is indicated as being not decodable or likely to be not decodable in case the one or more allocated resources experience one or more impairments by the transmitter and/or by the one or more further transmitters of the wireless communication network.

3. The receiver of claim 2, wherein the one or more impairments comprise puncturing, interference or a reduction of a signal strength caused by the transmitter and/or by the one or more further transmitters of the wireless communication network.

4. The receiver of claim 1, wherein
the retransmission request comprises a message signaling to the transmitter a pollution level of the one or more allocated resources for which the decoding failed, and
the message causes the transmitter to transmit a retransmission or additional redundancy for the encoded data transmitted on the one or more allocated resources which are associated with the signaled pollution level and/or associated with pollution levels higher than the signaled pollution level.

5. The receiver of claim 1, wherein
the retransmission request is a one bit message, and
in case the decoding failed for the one or more allocated resources comprised in the report, the processor is configured to cause the transceiver to send a first one bit message to the transmitter, the first one bit message causing the transmitter to transmit a retransmission or additional redundancy for the encoded data transmitted on the one or more allocated resources comprised in the report.

6. The receiver of claim 5, wherein
in case the decoding failed for one or more allocated resources of the plurality of resources not comprised in the report, the processor is configured to cause the transceiver to send a further retransmission request to the transmitter, the further retransmission request causing the transmitter to transmit a retransmission or additional redundancy for encoded data transmitted on the one or more allocated resources not comprised in the report for which the decoding failed or for the data block.

7. The receiver of claim 5, wherein
in case the decoding was successful for all resources of the data block, the processor is configured to cause the transceiver to send a second one bit message to the transmitter to acknowledge correct reception of the data block to the transmitter.

8. The receiver of claim 1, wherein
the retransmission request is a two bit message,
in case the decoding failed only for the one or more allocated resources comprised in the report, the processor is configured to cause the transceiver to send
   a first two bit message to the transmitter, the first two bit message causing the transmitter to transmit a retransmission or additional redundancy for the encoded data transmitted on the one or more allocated resources comprised in the report with a first pollution level, and
   a second two bit message to the transmitter, the second two bit message causing the transmitter to transmit the retransmission or additional redundancy for the encoded data transmitted on the one or more allocated resources comprised in the report with the first pollution level and a second pollution level, the first pollution level being higher than the second pollution level, and
in case the decoding failed for one or more resources of the plurality of resources not comprised in the report, the processor is configured to cause the transceiver to send a third two bit message to the transmitter.

9. The receiver of claim 8, wherein the third two bit message causes the transmitter to
allocate additional resources to the receiver to allow the receiver to specify the one or more resources not comprised in the report for which the decoding failed, and
transmit a retransmission or additional redundancy for encoded data transmitted on the one or more specified resources for which the decoding failed, or transmit a retransmission or additional redundancy for the data block.

10. The receiver of claim 8, wherein
in case the decoding was successful for all resources of the data block, the processor is configured to cause the transceiver to send a fourth two bit message to the transmitter to acknowledge correct reception of the data block to the transmitter.

11. The receiver of claim 1, wherein
in case the decoding was successful for all resources of the data block, the processor is configured to cause the transceiver to send a first retransmission message to the transmitter to acknowledge correct reception of the data block to the transmitter,
in case the decoding failed only for the one or more allocated resources comprised in the report, the processor is configured to cause the transceiver to send a second retransmission message or a third retransmission message to the transmitter, the second or third retransmission messages causing the transmitter to transmit a retransmission or additional redundancy for the encoded data transmitted on the one or more allocated resources comprised in the report based on their pollution levels, and in case decoding failed in any of the resources of the data block, the processor is configured to cause the transceiver to send a fourth retransmission message to the transmitter, the fourth retransmission message indicating the resources of the data block for which the decoding failed and causing the transmitter to transmit a retransmission or additional redundancy for the encoded data transmitted on the indicated resources of the data block for which the decoding failed.

12. The receiver of claim 1, wherein
the processor is configured to cause the transceiver to send a report request to the transmitter following the decoding of the data block and prior to determining for the allocated resources whether decoding of the encoded data was successful or failed, or in case decoding failed for one or more of the resources of the data block, and
the report request causes the transmitter to transmit the report to the receiver.

13. The receiver of claim 1, wherein
the transmitter and the one or more further transmitters of the wireless communication network operate using an agreed transmission pattern, the agreed transmission pattern being based on an Inter Cell Interference Coordination (ICIC) for a transmission of one or more data blocks, and the transmitter and the one or more further transmitters of the wireless communication network communicate over a backhaul interface on resources which are probably affected by interference.

14. The receiver of claim 1, wherein the report is transmitted to the receiver using a broadcast signal or a dedicated signal,
the broadcast signal comprises the report which indicates for a plurality of receivers served by the transmitter resources experiencing interference from the transmitter and/or from the one or more further transmitters of the wireless communication network, the plurality of receivers comprising all receivers served by the transmitter or a group of receivers served by the transmitter, and
the dedicated signal comprises the report which indicates for one dedicated receiver served by the transmitter resources experiencing interference from the transmitter and/or from the one or more further transmitters of the wireless communication network.

15. The receiver of claim 1, wherein the data block is defined by a plurality of symbols in time domain and by a plurality of sub-carriers in frequency domain, and the encoded data transmitted on the plurality of resources allocated to the receiver comprises a plurality of code blocks (CBs) or a plurality of code block groups (CBGs).

16. The receiver of claim 1, wherein the receiver operates in accordance with a Hybrid Automatic Repeat reQuest (HARQ) process, a predictive HARQ process or an early HARQ process, and the retransmission request comprises a request for information to correct decoding failures.

17. A transmitter, comprising
an antenna;
a transceiver coupled to the antenna, the transceiver configured to communicate with one or more receivers of a wireless communication network, the one or more receivers served by the transmitter;
wherein the transceiver is configured to transmit to the one or more receivers a report, the report indicating for one or more resources, which are allocated to the one or more receivers, that encoded data transmitted on the one or more allocated resources is not decodable or is likely to be not decodable,
wherein the report indicates for the one or more allocated resources a probability that encoded data is not decodable,
wherein the report associates the one or more allocated resources with a plurality of pollution levels dependent of a probability that the encoded data transmitted on the one or more allocated resources is not decodable, and
wherein the probability that the encoded data transmitted on the one or more allocated resources is not decodable depends on impairments the one or more allocated resources experience by the transmitter and/or by one or more further transmitters of the wireless communication network.

18. The transmitter of claim 17, wherein
the transmitter or the one or more further transmitters of the wireless communication network operate on a basis of a transmission pattern for a transmission of one or more data blocks, and
the transmitter comprises a processor configured to generate the report responsive to a change in the transmission pattern.

19. The transmitter of claim 18, wherein the change in the transmission pattern is caused by puncturing, interference or a reduction of a signal strength on the one or more allocated resources by the transmitter and/or by one or more further transmitters adjacent to the transmitter.

20. The transmitter of claim 18, wherein the change in the transmission pattern is caused by one or more unexpected transmissions on the one or more allocated resources by the transmitter and/or by one or more further transmitters adjacent to the transmitter.

21. The transmitter of claim 20, wherein the one or more unexpected transmissions on the one or more allocated resources comprise a transmission using a signal strength higher than defined by the transmission pattern.

22. The transmitter of claim 17, wherein
the transmitter and the one or more further transmitters of the wireless communication network operate using an agreed transmission pattern, the agreed transmission pattern being based on an Inter Cell Interference Coordination (ICIC) for a transmission of one or more data blocks.

23. The transmitter of claim 17, comprising a backhaul interface to the one or more further transmitters of the wireless communication network, the backhaul interface configured to communicate with the one or more further transmitters on resources which are probably affected by interference.

24. The transmitter of claim 17, wherein the transceiver is configured to transmit the report using a broadcast signal or a dedicated signal,
wherein the broadcast signal comprises the report which indicates for a plurality of receivers served by the transmitter resources experiencing interference from the transmitter and/or from the one or more further transmitters of the wireless communication network, the plurality of receivers comprising all receivers served by the transmitter or a group of receivers served by the transmitter, and wherein the dedicated signal comprises the report which indicates for one dedicated receiver served by the transmitter resources experiencing interference from the transmitter and/or from the one or more further transmitters of the wireless communication network.

25. The transmitter of claim 17, wherein
the transceiver is configured to transmit a data block to a certain receiver of the one or more receivers, the data block comprising encoded data transmitted on a plurality of resources allocated to the certain receiver; and
the transceiver is configured to receive from the certain receiver, responsive to the transmission of the data block, a retransmission request.

26. The transmitter of claim 25, wherein
the retransmission request comprises one or more of a first retransmission message, a second retransmission message and a third retransmission message,
the first retransmission message acknowledges correct reception of the data block at the certain receiver,
the second retransmission message indicates that decoding at the certain receiver failed only for the one or more allocated resources comprised in the report, the transceiver being configured to transmit, responsive to the second retransmission message, a retransmission or additional redundancy for the encoded data transmitted on the one or more allocated resources comprised in the report, and
the third retransmission message specifies one or more resources of the data block for which decoding at the certain receiver failed, the transceiver being configured to transmit, responsive to the third retransmission message, a retransmission or additional redundancy for encoded data transmitted on the one or more resources of the data block for which the decoding failed.

27. A communication network, comprising:
one or more receivers of claim 1, and
one or more transmitters, wherein the one or more transmitters are configured to transmit to the one or more receivers the report.

28. The communication network of claim 27, wherein the communication network comprises a wired communication network, a wireless communication network, a cellular network, a wireless local area network or a wireless sensor system.

29. The communication network of claim 27, using an Inverse Fast Fourier Transform (IFFT) based signal, wherein the IFFT based signal comprises Orthogonal Frequency-Division Multiplexing (OFDM) with Cyclic Prefix (CP), Discrete Fourier Transform-spread-OFDM (DFT-s-OFDM) with CP, IFFT-based waveforms without CP, filtered OFDM (f-OFDM), Filter-Bank MultiCarrier (FBMC), Generalized Frequency Division Multiplexing (GFDM) or Universal Filtered Multi Carrier (UFMC).

30. A method, comprising
receiving from a transmitter of a wireless communication network a data block, the data block comprising encoded data transmitted on a plurality of resources allocated to a receiver;
decoding the encoded data;
determining for the allocated resources whether decoding of the encoded data was successful or failed;
evaluating whether one or more of the allocated resources for which the decoding failed are comprised in a report, the report indicating for the one or more allocated resources that encoded data transmitted on the one or more allocated resources is not decodable or is likely to be not decodable, and
sending a retransmission request to the transmitter responsive to the evaluation,
wherein the report indicates for the one or more allocated resources a probability that the encoded data transmitted on the one or more allocated resources is not decodable,
wherein the report associates the one or more allocated resources with a plurality of pollution levels dependent of the probability that the encoded data transmitted on the one or more allocated resources is not decodable, and
wherein the probability depends on impairments the one or more allocated resources experience by the transmitter and/or by one or more further transmitters.

31. A method, comprising
communicating with one or more receivers of a wireless communication network, the one or more receivers served by a transmitter;
wherein the communicating with one or more receivers comprises transmitting to the one or more receivers a report, the report indicating for one or more resources allocated to the one or more receivers that encoded data transmitted on the one or more allocated resources is not decodable or is likely to be not decodable,
wherein the report indicates for the one or more allocated resources a probability that the encoded data transmitted on the one or more allocated resources is not decodable,
wherein the report associates the one or more allocated resources with a plurality of pollution levels dependent of the probability that the encoded data transmitted on the one or more allocated resources is not decodable, and
wherein the probability depends on impairments the one or more allocated resources experience by the transmitter and/or by one or more further transmitters.

32. A non-transitory digital storage medium having stored thereon a computer program for performing a method, comprising
receiving from a transmitter of a wireless communication network a data block, the data block comprising encoded data transmitted on a plurality of resources allocated to a receiver;
decoding the encoded data;
determining for the allocated resources whether decoding of the encoded data was successful or failed;
evaluating whether one or more of the allocated resources for which the decoding failed are comprised in a report, the report indicating for the one or more allocated resources that the encoded data transmitted on the one or more allocated resources is not decodable or is likely to be not decodable, and
sending a retransmission request to the transmitter responsive to the evaluation,
wherein the report indicates for the one or more allocated resources a probability that the encoded data transmitted on the one or more allocated resources is not decodable,
wherein the report associates the one or more allocated resources with a plurality of pollution levels dependent of the probability that the encoded data transmitted on the one or more allocated resources is not decodable, and
wherein the probability depends on impairments the one or more allocated resources experience by the transmitter and/or by one or more further transmitters,
when said computer program is run by a computer.

33. A non-transitory digital storage medium having stored thereon a computer program for performing a method, comprising
  communicating with one or more receivers of a wireless communication network, the one or more receivers served by a transmitter;
  wherein the communicating with one or more receivers comprises transmitting to the one or more receivers a report, the report indicating for one or more resources allocated to the one or more receivers that encoded data transmitted on the one or more allocated resources is not decodable or is likely to be not decodable,
  wherein the report indicates for the one or more allocated resources a probability that the encoded data transmitted on the one or more allocated resources is not decodable,
  wherein the report associates the one or more allocated resources with a plurality of pollution levels dependent of the probability that the encoded data transmitted on the one or more allocated resources is not decodable, and
  wherein the probability depends on impairments the one or more allocated resources experience by the transmitter and/or by one or more further transmitters,
  when said computer program is run by a computer.

* * * * *